US008578158B2

(12) United States Patent
Matsuda et al.

(10) Patent No.: US 8,578,158 B2
(45) Date of Patent: Nov. 5, 2013

(54) INFORMATION PROCESSING APPARATUS, COMPUTER-READABLE RECORDING MEDIUM CONFIGURED TO STORE COMMAND EXECUTION DETERMINATION PROGRAM, AND COMMAND EXECUTION DETERMINATION METHOD

(75) Inventors: Takashi Matsuda, Kawasaki (JP); Yoshiyuki Ohhira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 192 days.

(21) Appl. No.: 12/965,229

(22) Filed: Dec. 10, 2010

(65) Prior Publication Data

US 2011/0145825 A1 Jun. 16, 2011

(30) Foreign Application Priority Data

Dec. 15, 2009 (JP) ................................ 2009-283897

(51) Int. Cl.
*H04L 9/00* (2006.01)

(52) U.S. Cl.
USPC ........... 713/167; 713/165; 713/166; 713/171; 713/193; 726/4; 726/5; 726/14; 726/20

(58) Field of Classification Search
USPC ........................................................ 713/167
See application file for complete search history.

(56) References Cited

U.S. PATENT DOCUMENTS

| | | | | |
|---|---|---|---|---|
| 5,784,463 A * | 7/1998 | Chen et al. ..................... 713/171 |
| 6,219,790 B1 * | 4/2001 | Lloyd et al. ..................... 726/14 |
| 6,339,826 B2 * | 1/2002 | Hayes et al. ................... 713/166 |
| 6,389,543 B1 * | 5/2002 | Dawson et al. ................... 726/4 |
| 7,171,667 B2 * | 1/2007 | Libby ............................ 718/104 |
| 2003/0061482 A1 * | 3/2003 | Emmerichs ................... 713/165 |
| 2003/0191971 A1 * | 10/2003 | Klensin et al. ................ 713/201 |
| 2005/0257053 A1 * | 11/2005 | Genty et al. .................... 713/167 |
| 2006/0101512 A1 * | 5/2006 | Yoshida et al. .................. 726/20 |
| 2006/0106917 A1 * | 5/2006 | Lambourn et al. ............ 709/217 |
| 2007/0204171 A1 * | 8/2007 | Ito et al. ........................ 713/193 |
| 2010/0070614 A1 * | 3/2010 | Keum et al. .................... 709/219 |
| 2010/0077460 A1 * | 3/2010 | Hare et al. ......................... 726/5 |
| 2010/0325077 A1 | 12/2010 | Higuchi |

FOREIGN PATENT DOCUMENTS

| | | |
|---|---|---|
| JP | 9-288533 A | 11/1997 |
| JP | 11-259426 | 9/1999 |
| JP | 2006-79251 A | 3/2006 |
| JP | 2009-217497 | 9/2009 |
| WO | WO-2008-114560 A1 | 9/2008 |

OTHER PUBLICATIONS

Japanese Office Action mailed Sep. 3, 2013 for corresponding Japanese Application No. 2009-283897, with English-language translation.

* cited by examiner

*Primary Examiner* — Amare F Tabor
*Assistant Examiner* — Yonas Bayou
(74) *Attorney, Agent, or Firm* — Fujitsu Patent Center

(57) ABSTRACT

An information processing apparatus includes a memory that stores command execution right information including execution right information indicating whether a command is executable, and a command determination unit that determines whether an entered command is a target of a command execution determination where it is determined that whether a command is executable based on whether the entered command is invoked by a user command or a system command, and determines whether the entered command is executable with reference to the command execution right information stored in the memory when the entered command is determined as the target of the command execution determination.

9 Claims, 20 Drawing Sheets

FIG. 6

| INSTRUCTION COLUMN | OPERAND COLUMN |
|---|---|
| CMDLSRC | |
| COMMAND NAME | [PROFG-yyyyyyyy/zzzzzzzz/‥/···]<br>[PROFG-xxxx/wwwwww/‥/···/‥] |
| END | |

FIG. 7

| COMMAND1 | PROFG-AAAA/BBBBB |
|---|---|
| COMMAND2 | |
| COMMAND3 | PROF-WWWW |
| COMMAND4 | PROFG-CCC/DDDD/EEEE/FFF<br>PROF-GGG/HHHH/IIIIII/JJJJJJ |

FIG. 8

```
OS名  Vxx  CTLCMDLF  Vxx-Lxx  (CONTROL COMMAND LIMITED FILE)  YYYY.MM.DD/HH:MM:SS  PAGE-0001
(1)
FILE DATA : YY.MM.DD HH:MM.SS CREATE SYSTEM : Vxx  NUMBER OF COMMAND : 9999

NO.   COMMAND NAME
0001  COMMAND1    (PROFILE NAME)
                  XXXXXXX XXXXXXX   XXXXXXXX XXXXXXXX XXXXXXXX XXXXXXXX XXXXXXXX
                  (SECURITY GROUP NAME)
                  XXXXXXX XXXXXXX
0002  COMMAND2    (PROFILE NAME)
                  XXXXXXXX           XXXXXXXX XXXXXXXX XXXXXXXX XXXXXXXX XXXXXXXX
                  XXXXXXXX
------------------------------------------------------------------------
(2)
SYSTEM DATA : NUMBER OF COMMAND : 9999

NO.   COMMAND NAME
0001  COMMAND1    (PROFILE NAME)
                  XXXXXXX XXXXXXX   XXXXXXXX XXXXXXXX XXXXXXXX XXXXXXXX XXXXXXXX
                  (SECURITY GROUP NAME)
                  XXXXXXX XXXXXXX
0002  COMMAND2    (PROFILE NAME)
                  XXXXXXXX           XXXXXXXX XXXXXXXX XXXXXXXX XXXXXXXX XXXXXXXX
                  XXXXXXXX
```

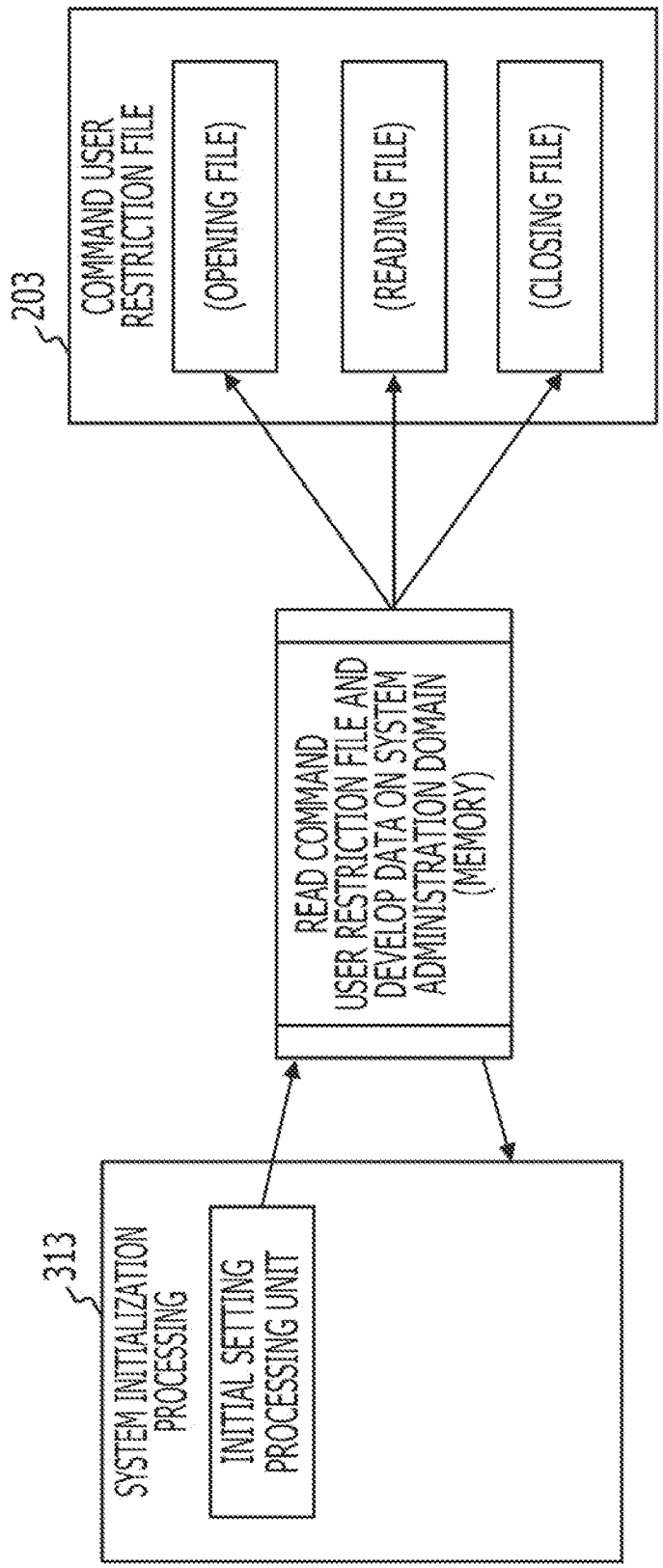

INFORMATION PROCESSING APPARATUS, COMPUTER-READABLE RECORDING MEDIUM CONFIGURED TO STORE COMMAND EXECUTION DETERMINATION PROGRAM, AND COMMAND EXECUTION DETERMINATION METHOD

CROSS-REFERENCE TO RELATED APPLICATIONS

This application is based upon and claims priority to prior Japanese Patent Application No. 2009-283897 filed on Dec. 15, 2009 in the Japan Patent Office, the entire contents of which are incorporated herein by reference.

FIELD

Embodiments discussed herein relate to an information processing apparatus, a computer-readable recording medium configured to store a command execution determination program, and a command execution determination method.

BACKGROUND

Conventionally, in an information processing apparatus such as a server, a command user restriction operation to restrict executable commands of general users, for example, to prevent the overwriting of the apparatus' setting, information, or the like, has been executed.

FIG. 1 illustrates a conventional command user restriction method.

In the conventional command user restriction method, a determination operation, where it is determined whether or not a command is executable (hereinafter, referred to as "command execution determination"), is executed to determine whether a system command 10 or a user command 11 that is issued by a user is executable. When it is determined that the issued command is executable, a program control unit 30 executes the issued command.

The command execution determination is not executed for a system command 20 or a user command 21 that is issued from an Operating System (OS); the program control unit 30 executes the issued command.

A system command is provided as a program by an OS.

A user command is created as a program by a user.

Both a user command and a system command may be simply referred to as a "command".

As illustrated in FIG. 1, resources 32-$m$ ($m$=1 to 5) such as files and programs are stored in a disk 31.

Access to the resources 32-$m$ stored in the disk 31 may be conducted by executing the command.

Security protection, called a command execution right, is set for the resources 32-1, 32-2, and 32-3, so that a particular user is allowed to access the resources. As described above, conventionally, the user restriction operation has been executed by the security protection setting.

The related techniques are discussed in Japanese Laid-open Patent Publication No. 2006-79251 and Japanese Laid-open Patent Publication No. 09-288533.

SUMMARY

According to an aspect of the invention, an information processing apparatus includes a memory that stores command execution right information including execution right information indicating whether a command is executable, and a command determination unit that determines whether an entered command is a target of a command execution determination where it is determined if a command is executable based on whether the entered command is invoked by a user command or by a system command, and determines whether the entered command is executable with reference to the command execution right information stored in the memory when the entered command is determined to be the target of the command execution determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6 illustrates a format of a command user restriction source;

FIG. 7 illustrates examples of the command user restriction source;

FIG. 8 illustrates a display example when content is displayed by execution of the CTLCMDLF command;

FIG. 9 illustrates relationships between system initialization processing and initial setting processing;

DESCRIPTION OF EMBODIMENTS

Embodiments are described below with reference to the drawings.

Figure 1:
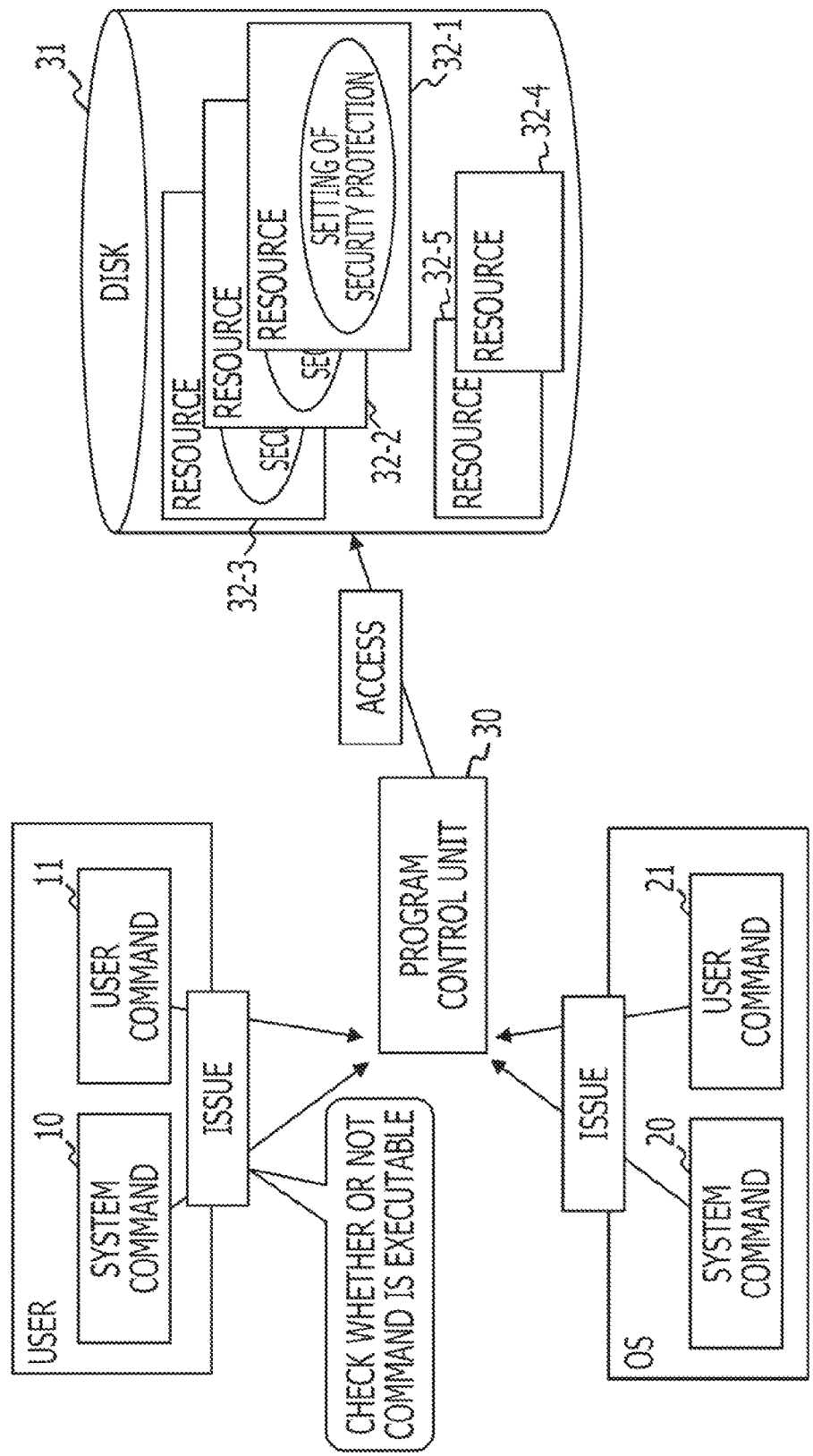
FIG. 1 illustrates a conventional command user restriction method.
Figure 2:
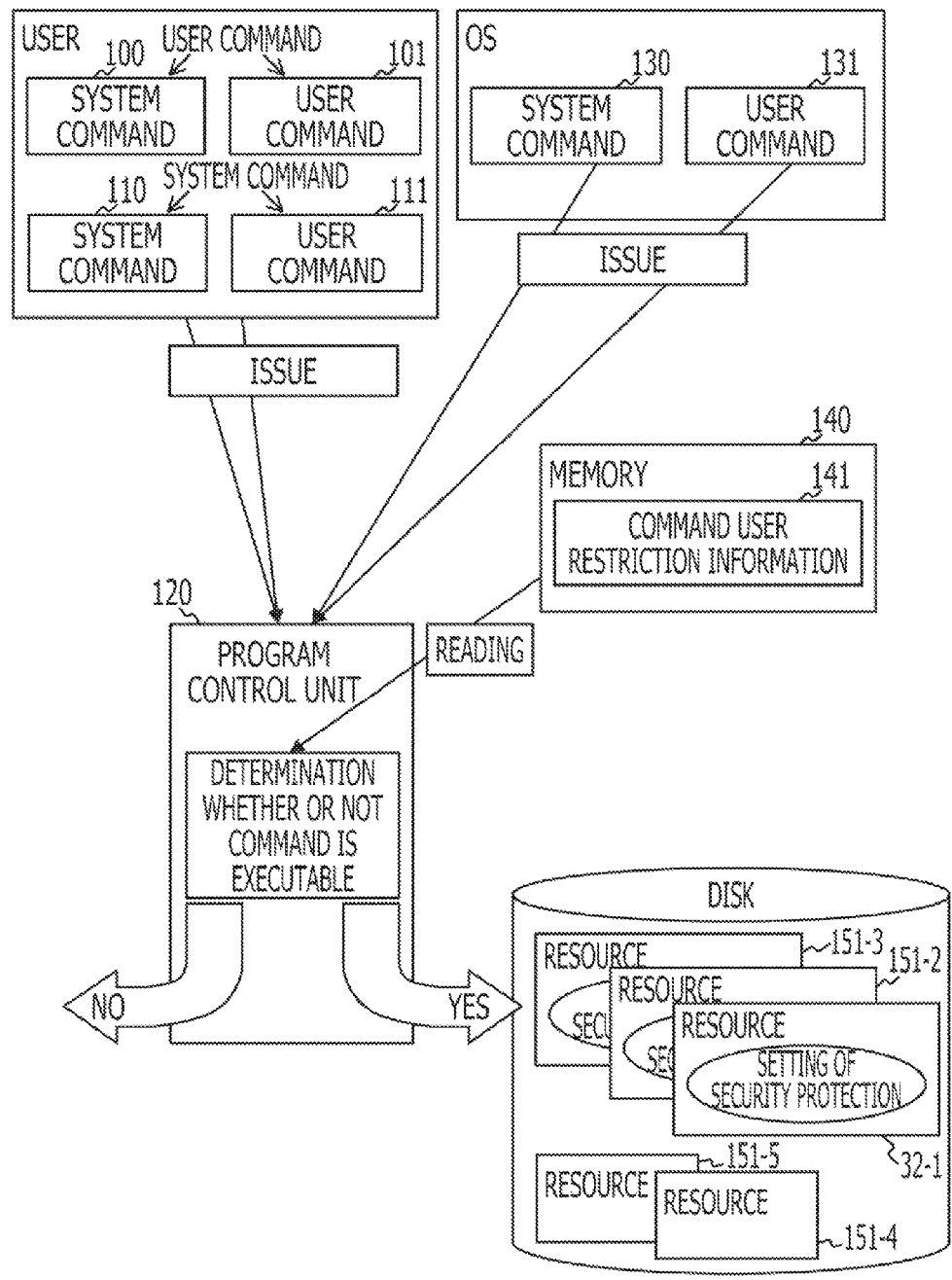
FIG. 2 illustrates a command user restriction method according to an embodiment.

FIG. 2 illustrates a command user restriction method according to an embodiment.

When a user executes system commands 100 or 110, or user commands 101 or 111 by inputting the commands from an input device such as a keyboard, the commands 100, 110, 101, or 111 are issued to a program control unit 120.

A command that a user executes includes a type of a command that invokes (utilizes) other commands. The other commands invoked by a command that a user executes are issued to the program control unit 120. The invoked commands include the system command 100 and the user command 101 that are invoked by an issued user command, and the system command 110 and the user command 111 that are invoked by an issued system command.

For example, when an OS executes a system command 130 or a user command 131, the system command 130 or the user command 131 is issued to the program control unit 120.

A system command is provided as a program by an OS.

A user command is created as a program by a user.

The program control unit 120 is implemented in an OS.

When a command is executed, the program control unit 120 first operates in an OS.

The program control unit 120 determines whether an entered command becomes a target of the command execution determination. For example, a command that a user executes and a system command invoked by a user command may be regarded as targets of the command execution determination.

When the entered command is the target of the command execution determination, the program control unit 120 determines whether the entered command is executable based on command user restriction information 141 stored in a memory 140.

A command, and a user who is allowed to execute the command, are defined in the command user restriction information 141. The command user restriction information 141 is described in detail later. The command user restriction information 141 is also referred to as command execution right information.

When the command is executable, access to resources 151-m (m=1 to 5) stored in a disk 150, for example, may be executed in accordance with the command execution.

When the command is unexecutable, for example, an error message is displayed.

According to the command user restriction method of the embodiment, a function of the command execution determination is implemented in an OS, so that the command execution determination for a command from not only a user but also the OS, may be executed.

In addition, because it is determined whether an entered command has been invoked from a user command or from a system command, a target of the command execution determination may be set in further detail.

In addition, because the command user restriction method may be executed by a user without setting security protection for each of the resources, an enormous amount of work hours may be reduced.

When setting of the security protection is executed for the resources 151-1, 151-2, and 151-3, the security in the command user restriction method may be strengthened.

Figure 3:
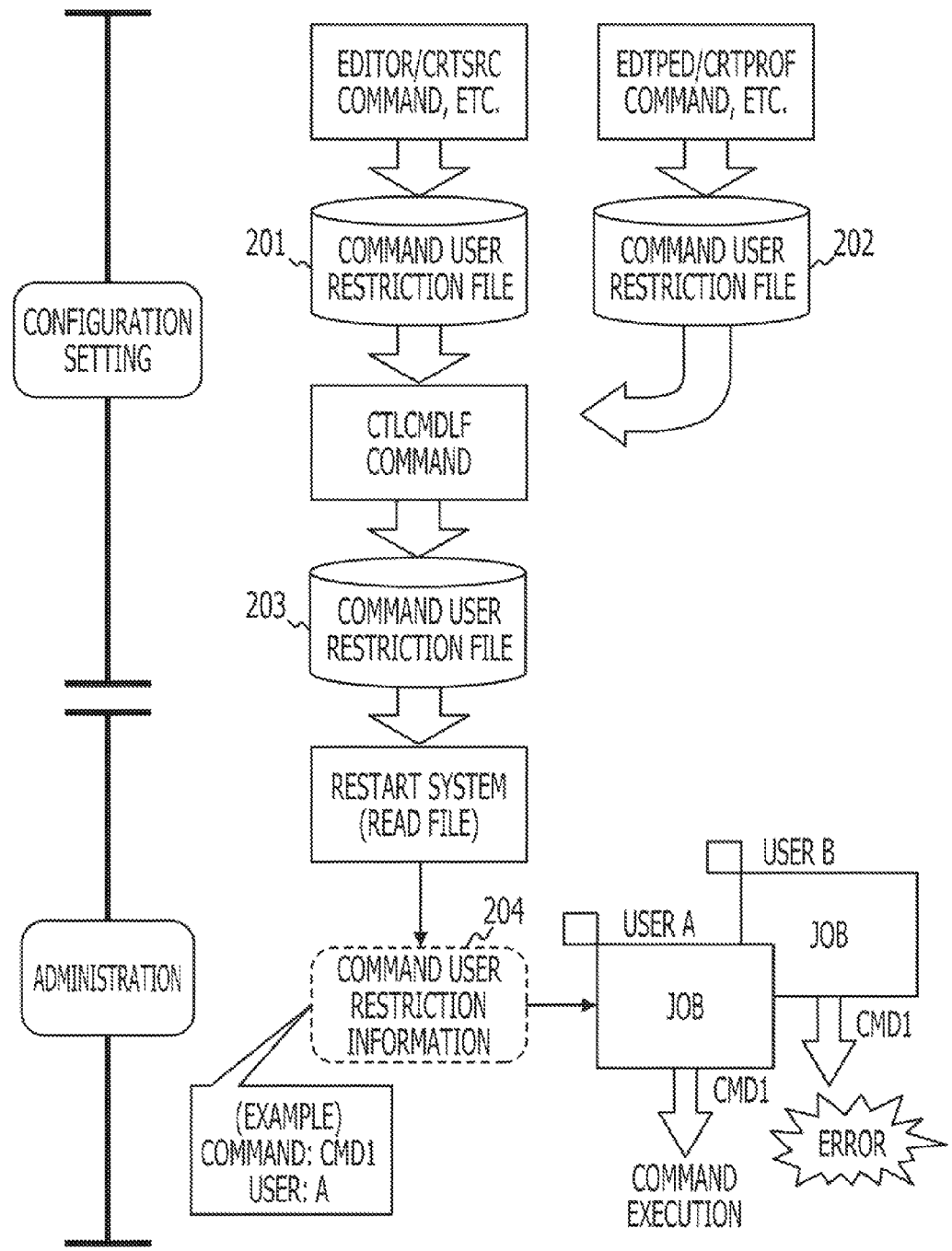
FIG. 3 illustrates a processing flow of the command user restriction method according to the embodiment.

FIG. 3 illustrates a processing flow in the command user restriction method according to the embodiment. The command user restriction method includes: performing a configuration setting where information such as that used for the command execution determination is generated; and performing administration of the command execution determination.

In the configuration setting operation, a system administrator creates a command user restriction source 201 using an EDITOR command, a CRTSRC command, or the like. The EDITOR command and the CRTSRC command are source (text) creation commands provided by an OS. User restricted commands and a user allowed to execute such commands are described in the command user restriction source 201.

In addition, the system administrator creates a profile information file 202 using an EDTPED command, a CRTPROF command, or the like. Each of the EDTPED command and the CRTPROF command is a command that performs the generation and modification of a profile, and the commands are provided by an OS. The profile is a so-called user account.

A profile name and the group name where the profile belongs are described in the profile information file 202.

The system administrator creates a command user restriction file 203 using a CTLCMDLF command.

The CTLCMDLF command is a command that performs the creation, deletion, content display, etc. of the command user restriction file 203 used for the command execution determination.

A command, and a user allowed to execute the command, are described in the command user restriction file 203.

For example, a user who is not registered in the system can not modify, delete, or refer to the command user restriction file 203, thereby strengthening security.

In the administering operation, the command user restriction file 203 is read when an OS is restarted, and the command user restriction file 203 is stored in a memory as command user restriction information 204.

The command execution determination for an entered command is executed based on the command user restriction information 204. For example, in the command user restriction information 204, a command may be "CMD1" and a user may be "A". That is, the user "A" may be allowed to execute the command "CMD1".

When the command "CMD1" is entered, it is checked as to which user has entered the command "CMD1". When the user "A" inputs the command "CMD1", the command "CMD1" is executed. For example, when a user "B" inputs the command "CMD1", that is, a user other than user "A" has entered the command, an error occurs and the command "CMD1" is not executed.

Figure 4:
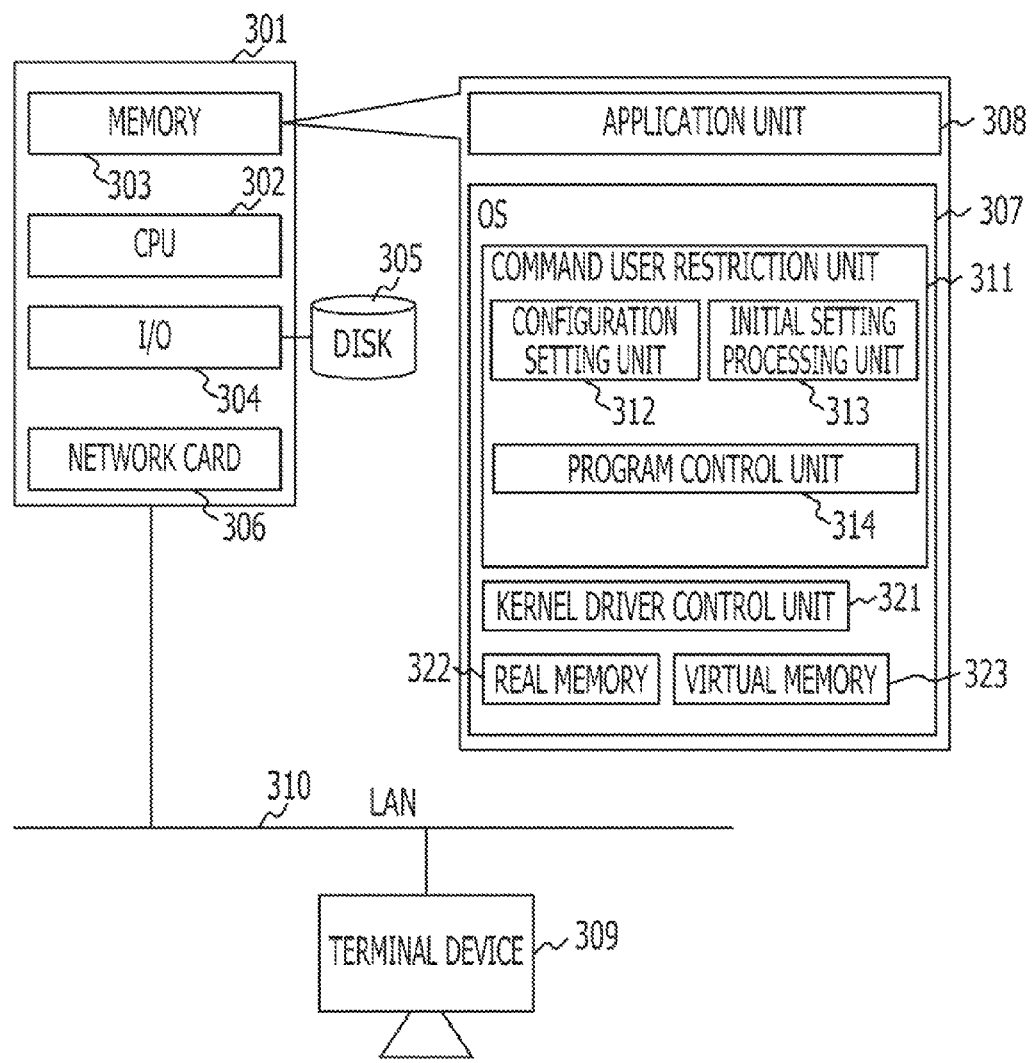
FIG. 4 illustrates a configuration of a command user restriction apparatus according to the embodiment.

FIG. 4 illustrates a configuration of a command user restriction apparatus 301 according to the embodiment.

The command user restriction apparatus 301 includes a Central Processing Unit (CPU) 302, a memory 303, an I/O port 304, a disk 305, a network card 306, an OS 307, and an application unit 308.

The CPU 302 executes various types of processing in the command user restriction apparatus 301.

The memory 303 stores various types of data used in the command user restriction apparatus 301. In addition, the OS 307 and the application unit 308 are stored in the memory 303.

The I/O port 304 is an interface where the command user restriction apparatus 301 is coupled to the disk 305.

The disk 305 stores various types of data and programs used in the command user restriction apparatus 301.

The command user restriction apparatus 301 is coupled to a terminal device 309 through a Local Area Network (LAN) 310.

The application unit 308 executes various types of applications used in the command user restriction apparatus 301.

The OS 307 includes a command user restriction unit 311, a kernel driver control unit 321, a real memory 322, and a virtual memory 323.

The command user restriction unit 311 includes a configuration setting unit 312, an initial setting processing unit 313, and a program control unit 314.

The configuration setting unit 312 performs configuration setting when the command execution determination is executed.

In the initial setting processing unit 313, data used for the command execution determination is read when the system starts up, and the data is stored in the memory 301.

The program control unit 314 performs the command execution determination for an issued command. The kernel driver control unit 321 controls the kernel and the driver in the OS 307. The real memory 322 includes a real memory area where data is stored. The virtual memory 323 includes a virtual memory area of the OS 307.

Figure 5:
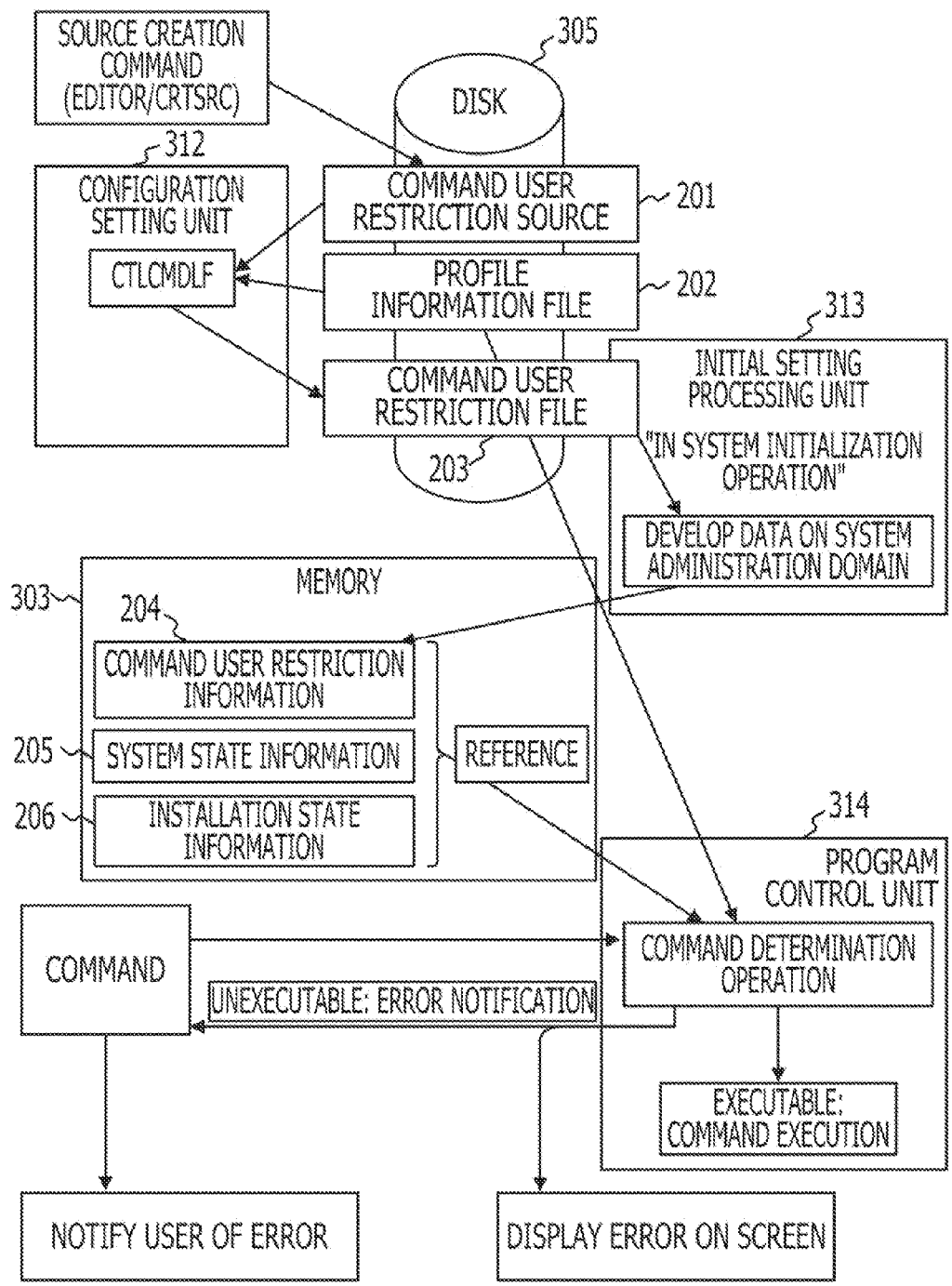
FIG. 5 illustrates the configuration and processing of the command user restriction apparatus according to the embodiment.

FIG. 5 illustrates the configuration and the processing in the command user restriction apparatus 301 according to the embodiment.

The system administrator creates the command user restriction source 201 in the disk 305 using the source creation command such as the EDITOR command or the CRTSRC command.

The system administrator creates the profile information file 202 using the profile generation command such as the EDTPED command or the CRTPROF command.

In the configuration setting unit 312, the command user restriction file 203 is generated based on the command user restriction source 201 and the profile information file 202 using the CTLCMDLF command.

The initial setting processing unit 313 develops the command user restriction file 203 in the memory 303 as the command user restriction information 204 when the initial setting processing unit 313 reads the command user restriction file 203 at system start up.

The program control unit 314 performs the command execution determination for an entered command based on the profile information file 202, the command user restriction information 204, system state information 205, and installation state information 206.

When it is determined that the entered command is executable, then the program control unit 314 executes the command. When it is determined that the entered command is unexecutable, then the program control unit 314 notifies the user of an error by displaying an error message on a screen.

The system state information 205 is information indicating whether the command user restriction apparatus 301 is in a maintenance operation.

The installation state information 206 is information that indicates whether the command user restriction apparatus 301 is in an installation operation.

The system state information 205 and the installation state information 206 is described in detail later. Operations and used data in each of the units in the command user restriction unit 311 are described in detail below.

In the configuration setting unit 312, the command user restriction file 203 is generated based on the command user restriction source 201 and the profile information file 202 that are used for the command execution determination.

The command user restriction source 201 (original text) is created using the source creation command such as the EDITOR command or the CRTSRC command by the system administrator.

The profile information file 202 is created by the system administrator using the profile generation command, such as the EDTPED command or the CRTPROF command.

FIG. 6 illustrates a format of the command user restriction source.

The command user restriction source 201 includes an instruction column and an operand column as items.

In the instruction column, "CMDLSRC", "COMMAND NAME", and "END" are described.

The "CMDLSRC" indicates the start of an instruction of the command user restriction source.

The "COMMAND NAME" indicates a command that is to be restricted. Different command names are described in between the "CMDLSRC" line and the "END" line.

In the command user restriction source, each command such as "CALL" (simple program invocation), "RETURN" (job termination), and "SIGNOFF" (emulator termination) that is used for the system operation, can not be specified.

The "END" indicates the termination of the instruction of the command user restriction source.

As illustrated in FIG. 6, in the operand column of a row where the command name of the instruction column is described, at least one of a PROFG parameter and a PROF parameter is described.

In the PROFG parameter, the name of a group allowed to utilize the command (security protection group name) is described. A profile belonging to the security protection group name is allowed to execute the command.

In the PROF parameter, the name of a profile able to utilize the command is described.

FIG. 7 illustrates examples of the command user restriction source.

As illustrated in FIG. 7, the first row of the examples indicates that a user corresponding to a profile where a security protection group name is "AAAA" or "BBBBB" is able to execute "COMMAND1".

The second row of the examples indicates that a regular profile can not execute "COMMAND2" because a security protection group name or a profile name that is able to execute the "COMMAND2" is not described.

The third row of the examples indicates that a user corresponding to a profile whose name is "WWWW" is able to execute "COMMAND3".

The fourth row of the examples indicates that a user corresponding to a profile where a security protection group name is "CCC", "DDDD", "EEEE", or "FFF", and a user corresponding to a profile whose name is "GGG", "HHHH", "III-III", or "JJJJJJ are able to execute "COMMAND4".

The generation of the command user restriction file 203 is described below.

In the configuration setting unit 312, the command user restriction file 203 is generated using the CTLCMDLF command provided in the system according to the embodiment.

The CTLCMDLF command generates the command user restriction file 203 in a binary format from the command user restriction source 201 in a text format.

The command user restriction file 203 includes a command name and the names of a profile and a security protection group that are able to execute the command. The command name and the names of the profile and the security protection group that can execute the command in the command user restriction file 203 are similar to the description in the command user restriction source 201.

The CTLCMDLF command adds information such as a character string used for determining whether data is correct, a creation date of the command user restriction file 203, the defined number of commands, and the file size, to the command user restriction file 203 as administrative information.

The CTLCMDLF command checks whether a profile name described in the command user restriction source 201 is correctly defined when the command user restriction file 203 is generated.

Whether the profile name is correctly defined is determined by comparing a profile name described in the command user restriction source 201 with the profile information file 202 where a profile name registered in the system is described.

When the profile name in the command user restriction source 201 is present in the profile information file 202, the CTLCMDLF command determines the profile is correctly defined and creates the command user restriction file 203.

When the profile name in the command user restriction source 201 is not present in the profile information file 202, the CTLCMDLF command determines the profile is not correctly defined, notifies a user of the result, and terminates the generation processing of the command user restriction file 203.

In addition, the CTLCMDLF command may perform replacement (updating), deletion, and content display of the command user restriction file 203.

To prevent the improper setting of command user restrictions in consideration of security, only a system administrator corresponding to a profile which has system administration authority is allowed to utilize the CTLCMDLF command. The CTLCMDLF command is not regarded as a target of the command execution determination.

FIG. 8 illustrates a display example when the display of content is executed using the CTLCMDLF command.

The CTLCMDLF command may display the content of the command user restriction file 203 that is stored in the command user restriction file 203 and the memory 303 such as a command name, and a profile name able to execute the command.

The portion above a broken line in FIG. 8 indicates (1) the latest information about the "command user restriction file", and the portion below the broken line in FIG. 8 indicates (2) information where the "command user restriction file" stored in the memory has been read.

"COMMAND NAME" in FIG. 8 is the name of a use-restricted system command.

"PROFILE NAME" in FIG. 8 is the name of a profile that can execute the specified command.

"SECURITY GROUP NAME" in FIG. 8 is the name of a security protection group that can execute the specified command.

In the operation of the command user restriction apparatus 301, when the command user restriction file 203 is modified, a difference between (1) and (2) is generated.

The type of setting where the operations of the command user restriction apparatus 301 is currently based may be found with reference to (2).

FIG. 9 illustrates relationships between system initialization processing and initial setting processing.

In the system initialization processing, an initial setting processing unit 313 reads the command user restriction file 203 created by the CTLCMDLF command in the order of the procedures of file opening, file reading, and file closing. After that, the initial setting processing unit 313 generates the command user restriction information 204 in a system administration domain of the memory 303.

Figure 10:
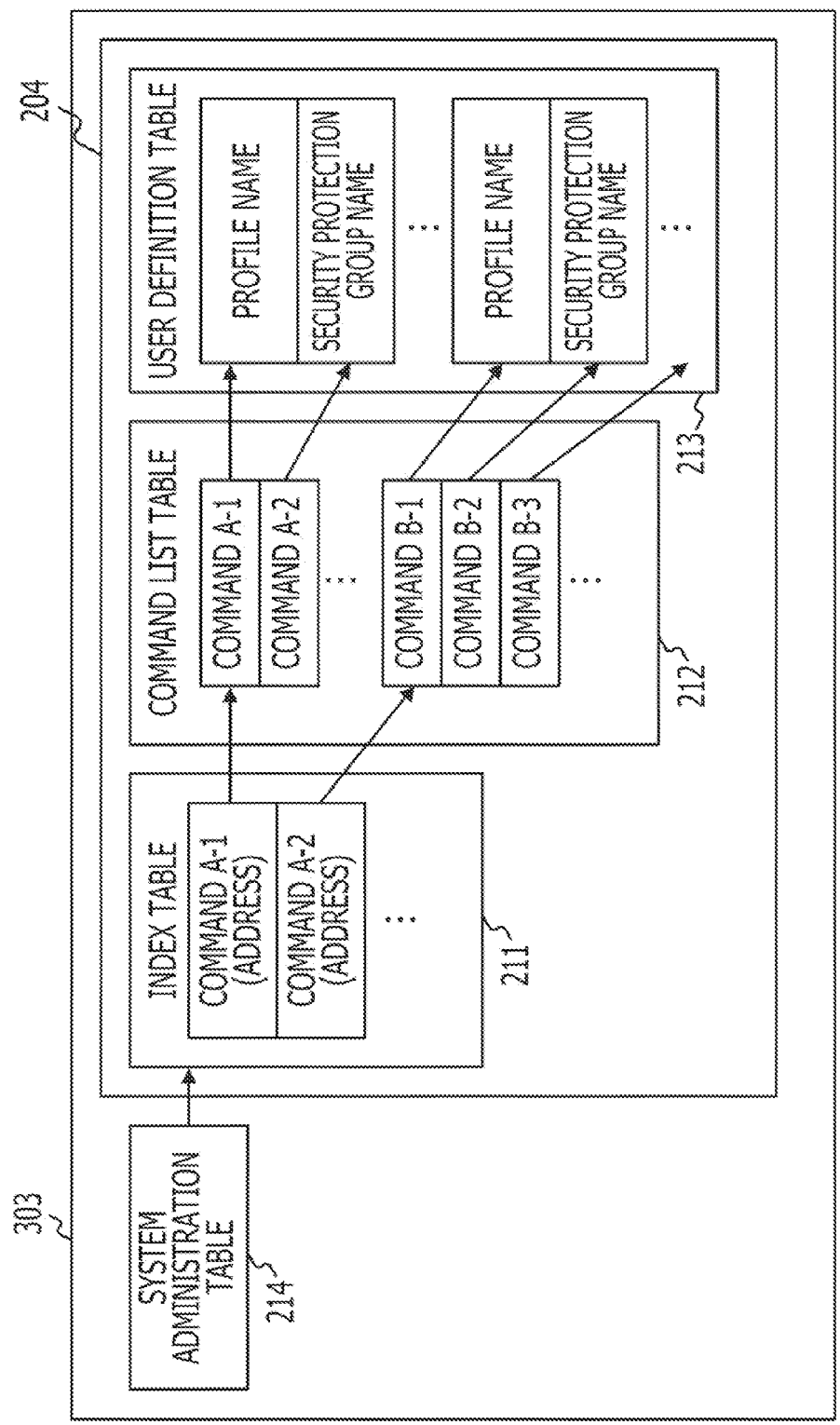
FIG. 10 illustrates a configuration of command user restriction information.

FIG. 10 illustrates a configuration of the command user restriction information 204.

The command user restriction information 204 generated in the memory 303 includes an index table 211, a command list table 212, and a user definition table 213.

The memory 303 includes a system administration table 214.

The system administration table 214 is a basic administration table in the memory 303 that is placed at a location accessible from the OS 307, and is linked to the index table 211.

The index table 211 is a table used when the retrieval of the command list table 212 is speeded up.

The total value of character codes from the fourth character to the eighth character of a command name (hereinafter, referred to as an "index key") is calculated. When the address of the command list table 212 is represented by four bytes, the value where the lower five bits in the total value is quadrupled may be set as an offset value of the index table 211.

In an offset value of the index table 211, the address of a leading command in a series of commands including the index key used for calculating the offset value is described.

The command list table 212 is a table used when the retrieval of the user definition table 213 is speeded up. In the command list table 212, a command name that is set in the command user restriction file 203 is registered. The total value of character codes from the fourth character to the eighth character of the command name is calculated and the lower five bits in the total value is set as a key. The command list table 212 is sorted based on the key. That is, in the command list table 212, commands are registered by each group of commands whose key values are similar.

In FIG. 10, commands A-1 and B-1 have the similar key values, and commands B-1, B-2, and B-3 have also the similar key values. Each of the commands A-1 and B-1 is a leading command of each of the command groups, respectively.

In the index table 211, the address of the commands A-1 and B-1 are described.

In the user definition table 213, the profile name and the security protection group name are registered.

A link to each of the names of the profile and the security protection group that are able to execute the corresponding command from each of the command names in the command list table 212 is provided. In addition, when a profile and a security protection group that correspond to the command are not present, the link is not provided.

A command user may be quickly retrieved by the above-described data structure.

Figure 11:
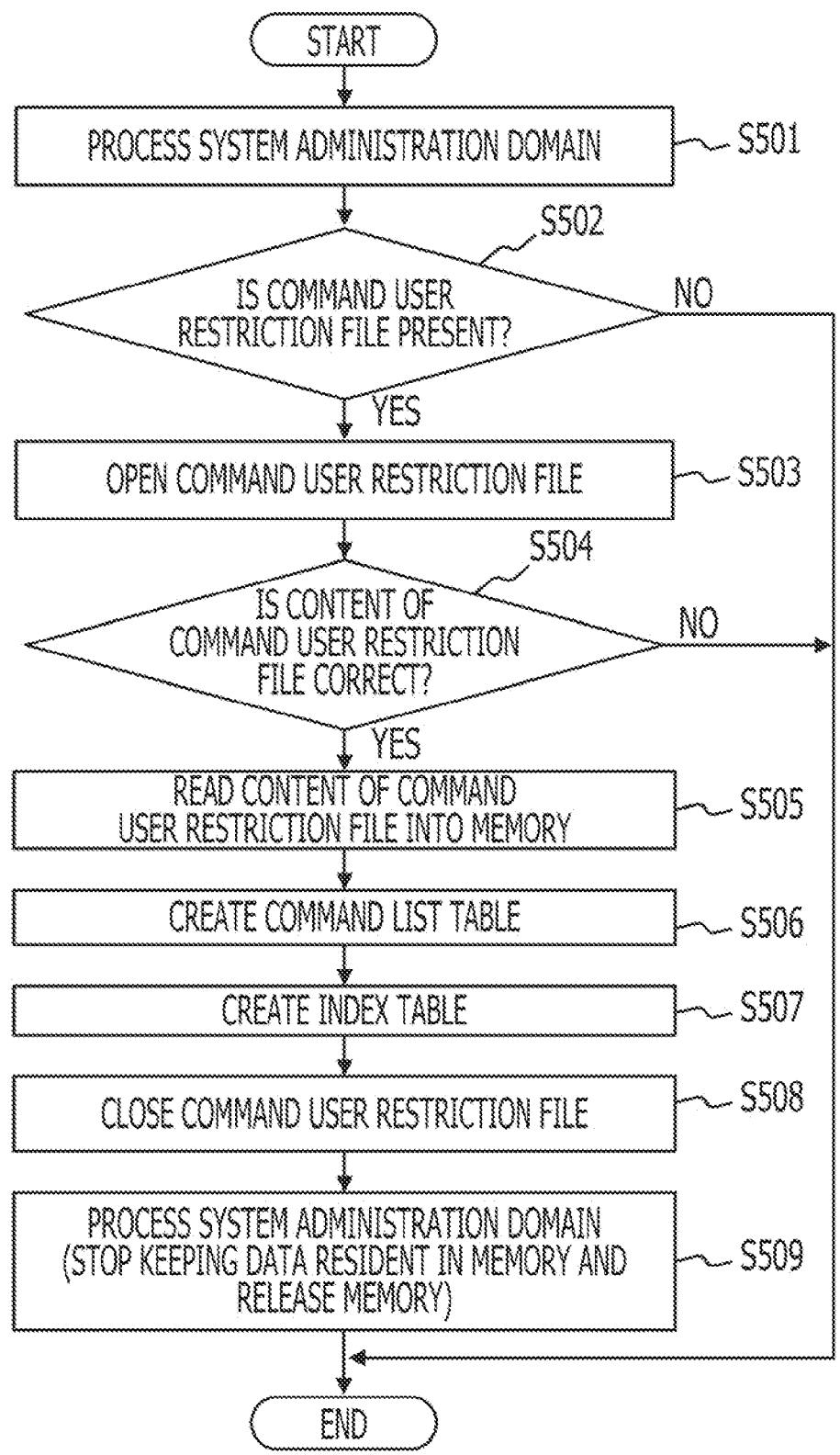
FIG. 11 illustrates a flowchart of the system initialization processing.

FIG. 11 illustrates a flowchart of the system initialization processing.

In operation S501, the initial setting processing unit 313 performs system administration domain processing, obtains the system administration domain of the memory 303, and allows data to be processed to remain resident in the system administration domain.

In operation S502, the initial setting processing unit 313 determines whether the command user restriction file 203 is present in the disk 305. When the command user restriction file 203 is present in the disk 305, the flow proceeds to operation S503, and when the command user restriction file 203 is not present in the disk 305, the processing terminates.

In operation S503, the initial setting processing unit 313 causes the command user restriction file 203 to open and makes the command user restriction file 203 available.

In operation S504, the initial setting processing unit 313 reads the administrative information in the command user restriction file 203 and checks whether the content of the administrative information is correct.

A character string used for checking whether the command user restriction file 203 is correct is included in the administrative information.

In addition, the initial setting processing unit 313 extracts, for example, size information of data in the administrative information, and checks whether the command user restriction file 203 is correct, based on the size information.

When the command user restriction file 203 is correct, the flow proceeds to operation S505, and when the command user restriction file 203 is not correct, the processing terminates.

In operation S505, the initial setting processing unit 313 reads the command user restriction file 203 and creates the user definition table 213 in the memory 303.

In operation S506, the initial setting processing unit 313 performs the following processing.

The initial setting processing unit 313 creates the command list table 212 to be sorted from the command user restriction file 203.

The initial setting processing unit 313 creates key data for the index table 211 in the command list table 212.

The initial setting processing unit 313 sorts the command list table 212 using the key data.

The initial setting processing unit 313 obtains a memory area for storing the index table 211 and the command list table 212 and copies the command list table 212 to the memory area.

The initial setting processing unit 313 creates a link between the command list table 212 and the user definition table 213.

In operation S507, the initial setting processing unit 313 performs the following processing.

The initial setting processing unit 313 generates the index table 211.

The initial setting processing unit 313 creates a link between the system administration table 214 and the index table 211.

The initial setting processing unit 313 creates a link between the index table 211 and the command list table 212.

The initial setting processing unit 313 outputs a message of normal termination.

In operation S508, the initial setting processing unit 313 closes the command user restriction file 203.

In operation S509, the initial setting processing unit 313 performs system administration domain processing, stops keeping the data resident in the system administration domain, and releases the system administration domain.

Figure 12:
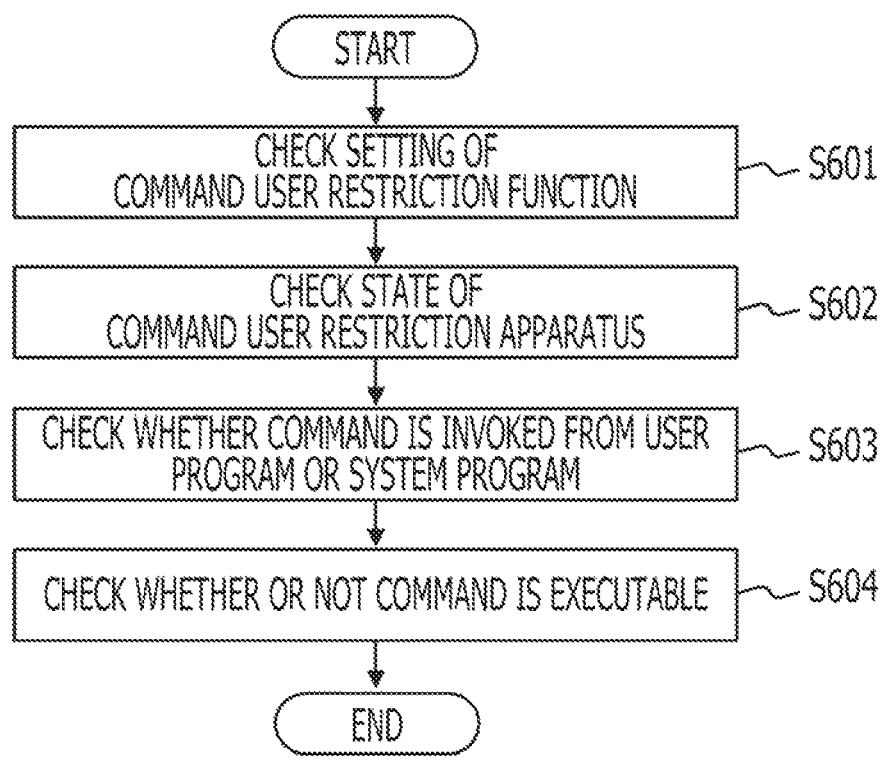
FIG. 12 illustrates a flowchart of operations in a program control unit.
Figure 13A:
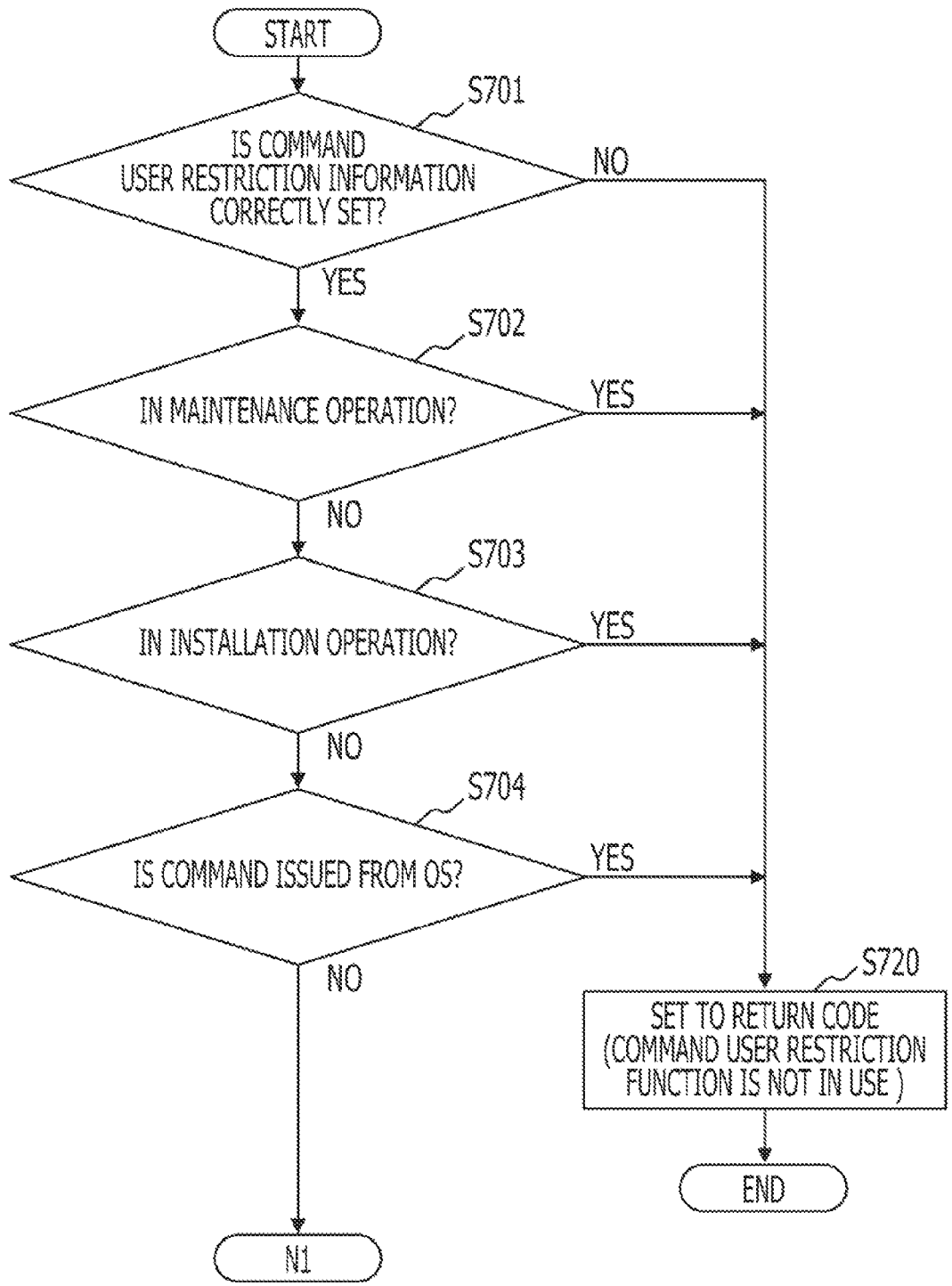
FIG. 13A illustrates a flowchart of detailed operations in the program control unit.
Figure 13B:
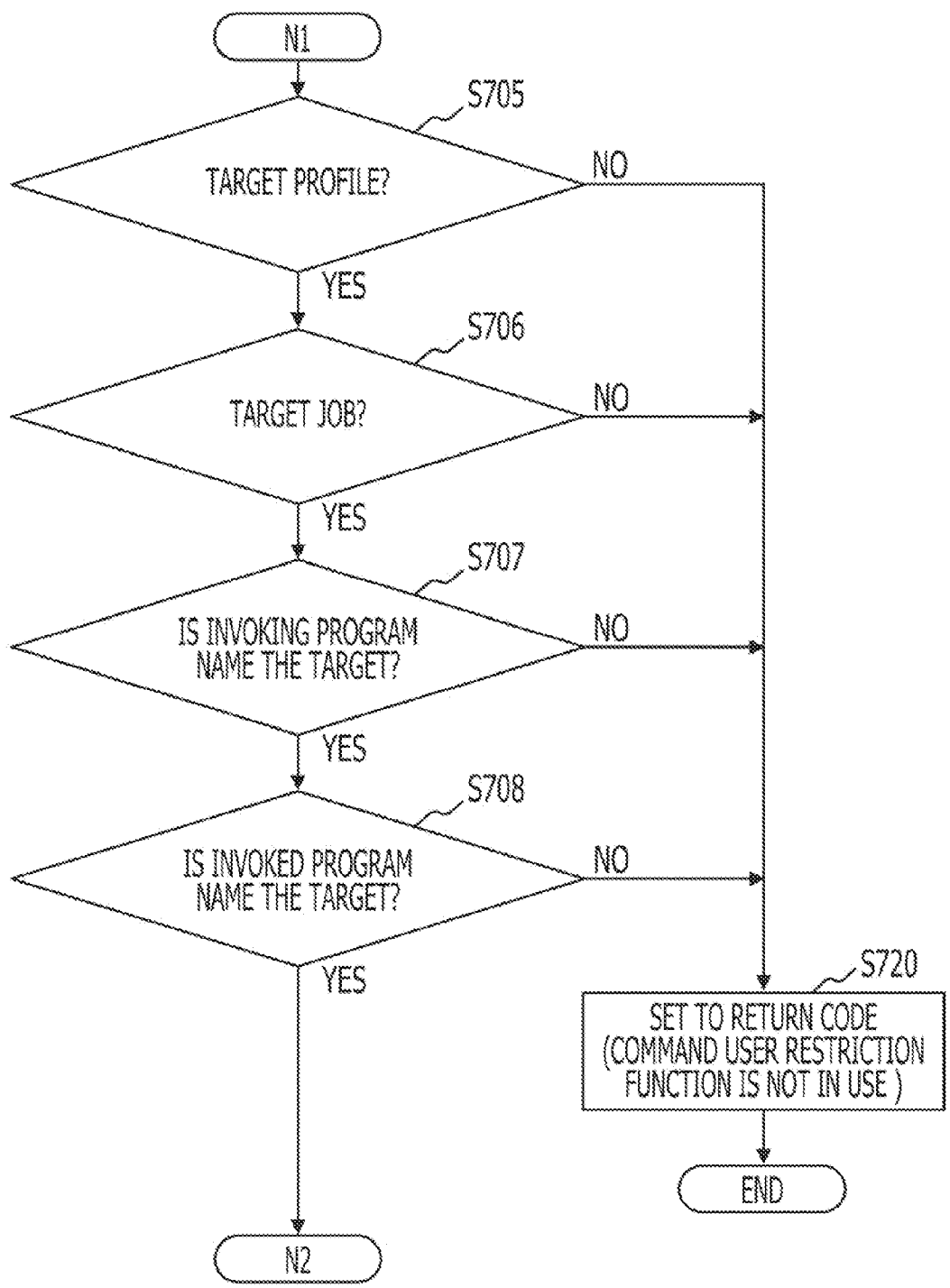
FIG. 13B illustrates a flowchart of detailed operations in the program control unit.
Figure 13C:
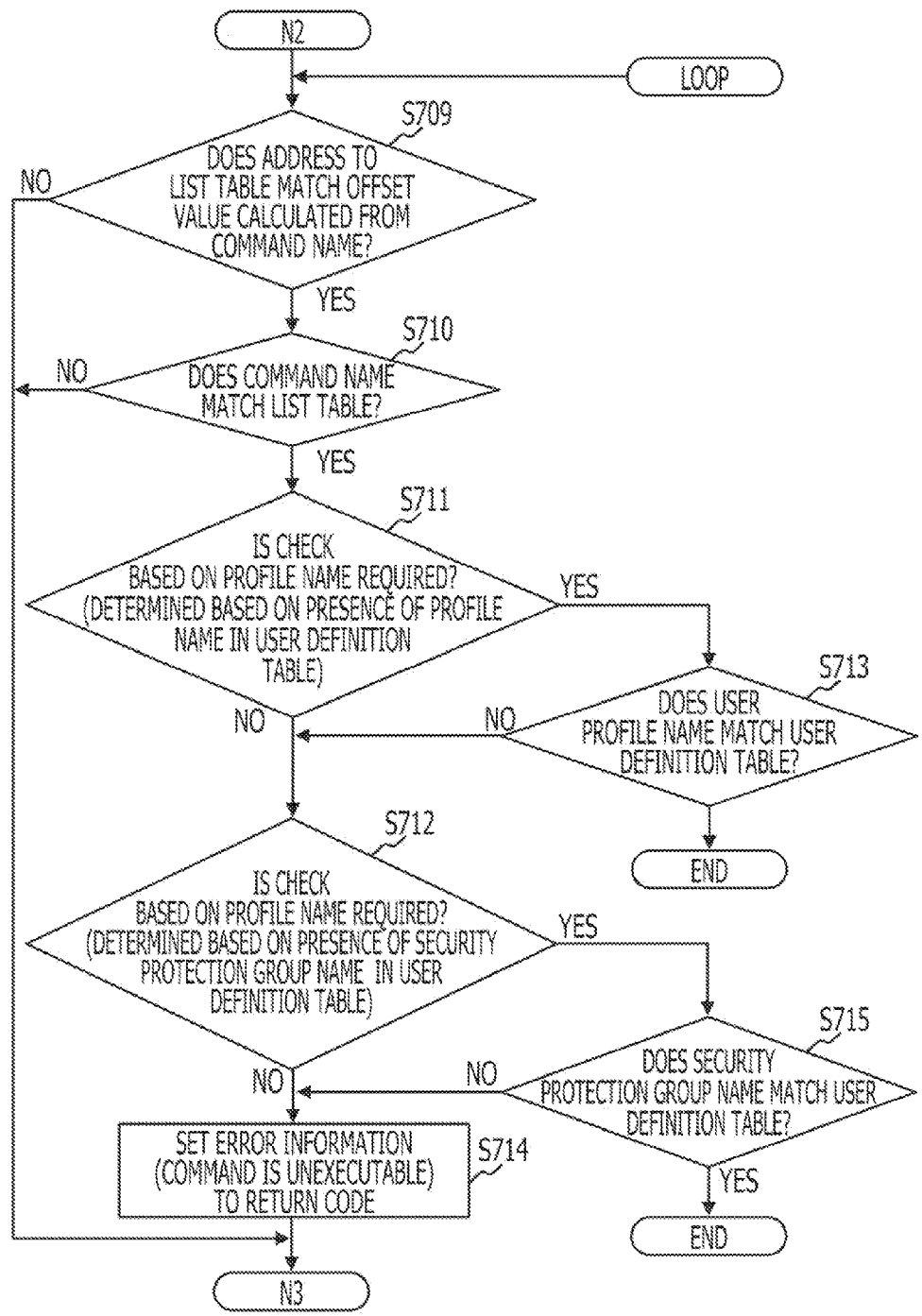
FIG. 13C illustrates a flowchart of detailed operations in the program control unit.
Figure 13D:
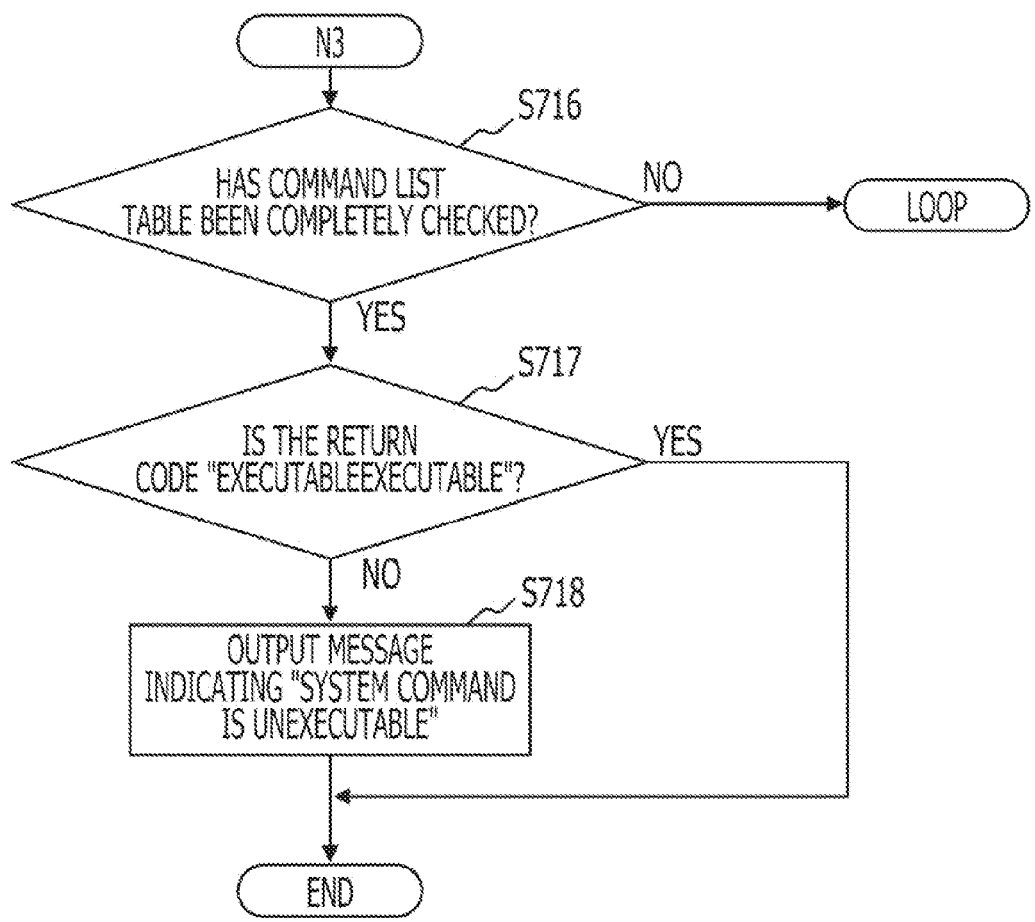
FIG. 13D illustrates a flowchart of detailed operations in the program control unit.

FIG. 12 illustrates a flowchart of operations in the program control unit 314.

In operation S601, the program control unit 314 checks whether the command user restriction information 204 is correctly set in the memory 303. For example, the program control unit 314 checks the command user restriction information 204 based on whether there is a link from the system administration table 214 to the index table 211.

In operation S602, the program control unit 314 checks the state of the command user restriction apparatus 301. Specifically, the program control unit 314 checks whether the command user restriction apparatus 301 is in a maintenance operation, and whether the command user restriction apparatus 301 is in an installation operation. When the command user restriction apparatus 301 is in the maintenance operation or the installation operation, the command execution determination is not executed.

The reason the command execution determination is not executed is because, when the command user restriction apparatus 301 is in a maintenance operation or an installation operation, the command execution determination is not executed to cause a maintenance operation or installation operation command to operate correctly, even when the command can not be used due to the command execution determination's setting.

When a function to disable the command execution determination based on a state of the apparatus is not employed in the program control unit 314, the deactivation and subsequent resetting of the command user restriction function are generally executed in the maintenance operation or the installation operation for the system, causing a deterioration of operability of the system.

In the command user restriction apparatus 301 according to the embodiment, when a state-check function is employed, since the maintenance operation and the installation operation for the system are generally executed without the deactivation and resetting of the command user restriction function, the operability of the system may be improved.

In operation S603, the program control unit 314 checks the types of commands through which user an entered command (program) is executed, for example, and whether the entered command is invoked from a system command or a user command.

In operation S604, the program control unit 314 determines whether the entered command is executable, based on the command user restriction information 204.

FIGS. 13A to 13D illustrate a flowchart of detailed operations in the program control unit 314.

In operation S701, the program control unit 314 checks whether the command user restriction information 204 is correctly set in the memory 303. For example, the program control unit 314 checks the command user restriction information 204 based on whether a link from the system administration table 214 to the index table 211 exists. When the command user restriction information 204 is correctly set, the flow proceeds to operation S702, and when the command user restriction information 204 is not correctly set, the flow proceeds to operation S720.

In operation S702, the program control unit 314 checks whether the command user restriction apparatus 301 is in a maintenance operation. The checking processing of whether the command user restriction apparatus 301 is in the maintenance operation is described later. When the command user restriction apparatus 301 is in the maintenance operation, the flow proceeds to operation S720, and when the command user restriction apparatus 301 is not in the maintenance operation, the flow proceeds to operation S703.

In operation S703, the program control unit 314 checks whether the command user restriction apparatus 301 is in an installation operation. The checking processing of whether the command user restriction apparatus 301 is in the program (e.g., an application program) installation operation is described later. When the command user restriction apparatus 301 is in the installation operation, the flow proceeds to operation S720, and when the command user restriction apparatus 301 is not in the installation operation, the flow proceeds to operation S704.

In operation S704, the program control unit 314 determines whether an entered command is issued from an OS or a user. An entered command is stored on a system job space or a user job space based on whether the entered command is issued from an OS or a user. Whether an entered command is issued from an OS or a user is determined based on the job space where the entered command operates. When an OS issues the entered command, the flow proceeds to operation S720, and when a user issues the entered command, the flow proceeds to operation S705.

In operation S705, the program control unit 314 determines whether a user who has issued the entered command is a target profile of the command execution determination. When the user is regarded as a profile that is not the target profile, the flow proceeds to operation S720; and when the user is regarded as the target profile, the flow proceeds to operation S706. The system administrator is regarded as a profile that is not a target of the command execution determination so that the command execution by the system administrator is not restricted.

In operation S706, the program control unit 314 determines whether the entered command is initiated from a target job of the command execution determination, in other words determines whether the command is included in the target job. When the entered command is not included in the target job, the flow proceeds to operation S720, and when the entered command is included in the target job, the flow proceeds to operation S707.

The name of a job that is not a target may be previously registered in the program control unit 314. A "job" is a group of commands that performs specific processing.

In operation S707, the program control unit 314 determines whether a command included in an invoking program of the entered command is a target of the command execution determination. In the embodiment, when an invoking program is a system command, the command included in the invoking program is not regarded as the target of the command execution determination, and when an invoking program is a user command, the command included in the invoking program is regarded as the target of the command execution determination. Thus, when an invoking program is a system command, the flow proceeds to operation S720, and when an invoking program is a user command, the flow proceeds to operation S708.

In operation S708, the program control unit 314 determines whether an invoked program (the entered command) is a target of the command execution determination. When the invoked program is a user command, the invoked program is not regarded as the target of the command execution determination, and when the invoked program is a system command, the invoked program is regarded as the target of the command execution determination. Thus, when the invoked program is a user command, the flow proceeds to operation S720, and when the invoked program is a system command, the flow proceeds to operation S709.

In the embodiment, the processing in both operations S707 and S708 are executed, however, the processing in either operations S707 or S708 may be executed.

The processing in operations S707 and S708 are described in detail later.

In operation S709, the program control unit 314 calculates an index key value and an offset value from the issued command name and determines whether an address of the command list table 212 is present in the offset value of the index table 211. When the address is present in the offset value of the index table 211, the flow proceeds to operation S710, and when the address is not present in the offset value of the index table 211, the flow proceeds to operation S716.

In operation S710, the program control unit 314 determines whether the issued command name is present in the command list table 212. When the issued command name is present in the command list table 212, the flow proceeds to operation S711, and when the issued command name is not present in the command list table 212, the flow proceeds to operation S716.

In operation S711, the program control unit 314 determines whether a checking operation is necessary, based on the presence of a profile name. The presence or absence of a profile name is checked with reference to the user definition table 213 linked from the command list table 212. When a profile name is present in the user definition table 213, it may be determined that the checking operation is necessary because the profile name has been set. When it is determined that the check operation is necessary based on the presence of a profile name, the flow proceeds to operation S713, and when it is determined that the check operation is unnecessary based on the absence of a profile name, the flow proceeds to operation S712.

In operation S712, the program control unit 314 determines whether a checking operation is necessary based on the presence of a security protection group name. The presence or absence of a security protection group name is checked with reference to the user definition table 213 linked from the command list table 212. When it is determined that the check operation is necessary based on the presence of a security protection group name, the flow proceeds to Operation S715, and when it is determined that the check operation is unnecessary based on the absence of a security protection group name, the flow proceeds to operation S714.

In operation S713, the program control unit 314 checks whether the profile of the user who has issued the command is present among the profile names in the user definition table 213 that is linked from a command corresponding to the entered command in the command list table 212 with reference to the user definition table 213. When the profile of the user is present in the user definition table 213, the program control unit 314 determines the command that has been issued by the user is executable and terminates the processing. When the profile of the user is not present in the user definition table 213, the flow proceeds to operation S712.

In operation S714, the program control unit 314 is able to determine that the issued command is set not to be executed and an "unexecutable" error information indication is set to the return code. When the issued command is set to be executed, the program control unit 314 sets "executable" to the return code.

In operation S715, the program control unit 314 checks whether the name of a group to which the user who has issued the command belongs is present in security protection group names in reference to the user definition table 213, which is linked from a command corresponding to the entered command in the command list table 212.

When the name of the group to which the user belongs is present in the user definition table 213, the program control unit 314 determines the command that has been issued by the user is executable and terminates the processing. When the name of the group to which the user belongs is not present in the user definition table 213, the flow proceeds to operation S714.

In operation S716, the program control unit 314 determines whether the command list table 212 has been completely checked. When the command list table 212 has been completely checked, the flow proceeds to operation S717, and when the command list table 212 has not been completely checked, the flow returns to operation S709.

In operation S717, the program control unit 314 checks whether the content of the return code indicates "unexecutable" or "executable". When the content of the return code is "unexecutable", the flow proceeds to operation S718, and when the content of the return code is "executable", the program control unit 314 terminates the processing.

In operation S718, the program control unit 314 outputs a message indicating that the command is "unexecutable".

In operation S720, the program control unit 314 sets to the return code that a command user restriction function is not in use.

In operation S702, the checking processing of whether the command user restriction apparatus 301 is in the maintenance operation is described below.

Figure 14:
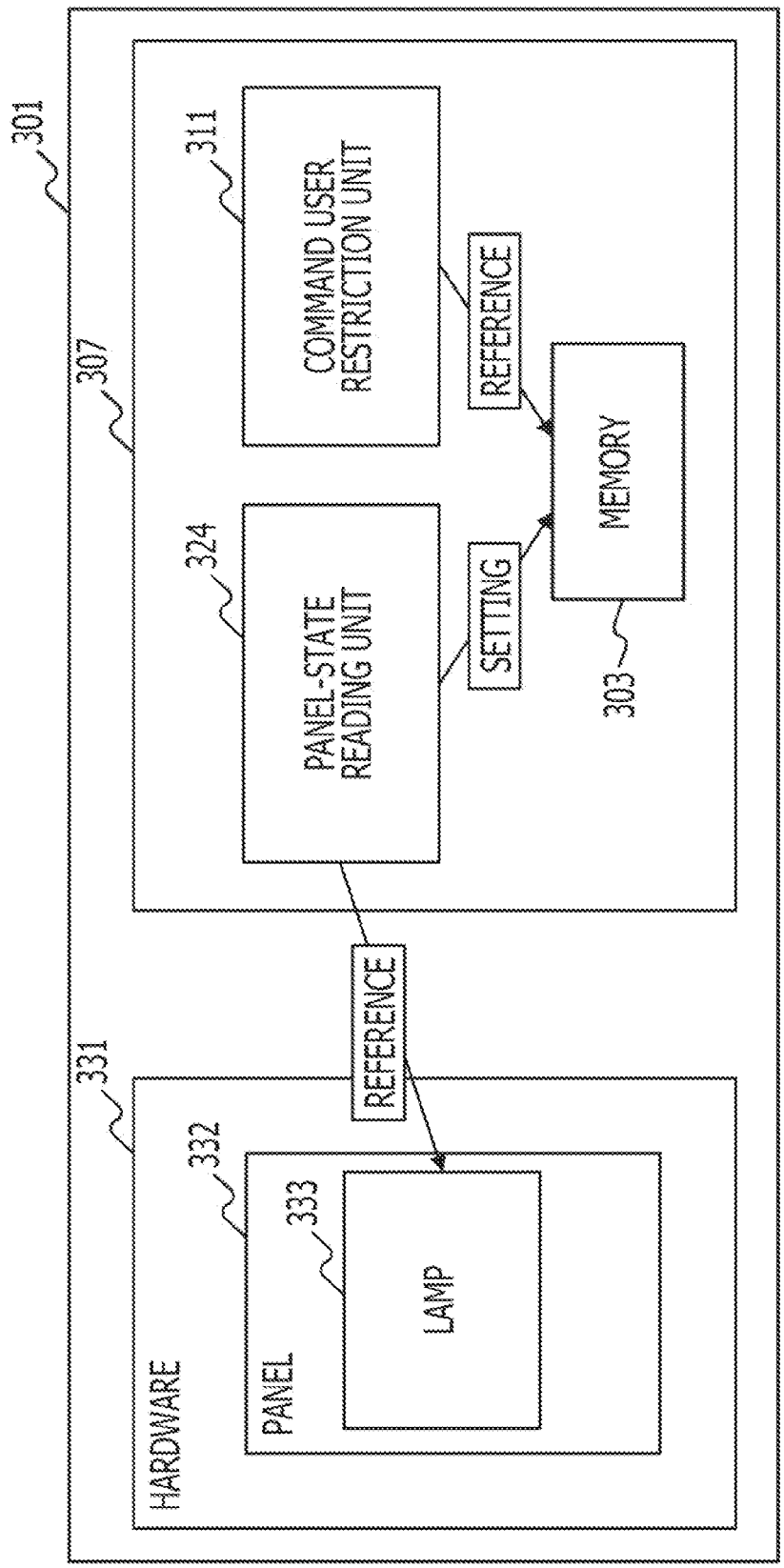
FIG. 14 illustrates a configuration of the command user restriction apparatus according to the embodiment.

FIG. 14 illustrates a configuration of the command user restriction apparatus 301 according to the embodiment.

Hardware 331 of the command user restriction apparatus 301 includes a panel 332 provided with lamp 333 and a memory 303.

The system administrator turns on the lamp 333 in the maintenance operation (maintenance mode) and turns off the lamp 333 in the normal operation of the command user restriction apparatus 301.

The OS 307 of the command user restriction apparatus 301 includes a panel-state reading unit 324 and the command user restriction unit 311.

The panel-state reading unit 324 reads whether the lamp 333 is in an on-state or an off-state, and writes system state information indicating that the lamp 333 is in the on-state or the off-state into the memory 303.

The command user restriction unit 311 determines whether the command user restriction apparatus 301 is in the maintenance mode with reference to the system state information.

The command user restriction unit 311 may determine by directly reading the state of the panel 332 if the command user restriction apparatus 301 is in the maintenance mode.

Due to the function for determining if the command user restriction apparatus 301 is in the maintenance mode, at a given point in time, the system administrator enables or disables the command user restriction function, that is, the command execution determination by operating the lamp 333, improving the flexibility of the system.

In operation S703, the checking processing of whether the command user restriction apparatus 301 is in a state of installing a program is described below.

Figure 15:
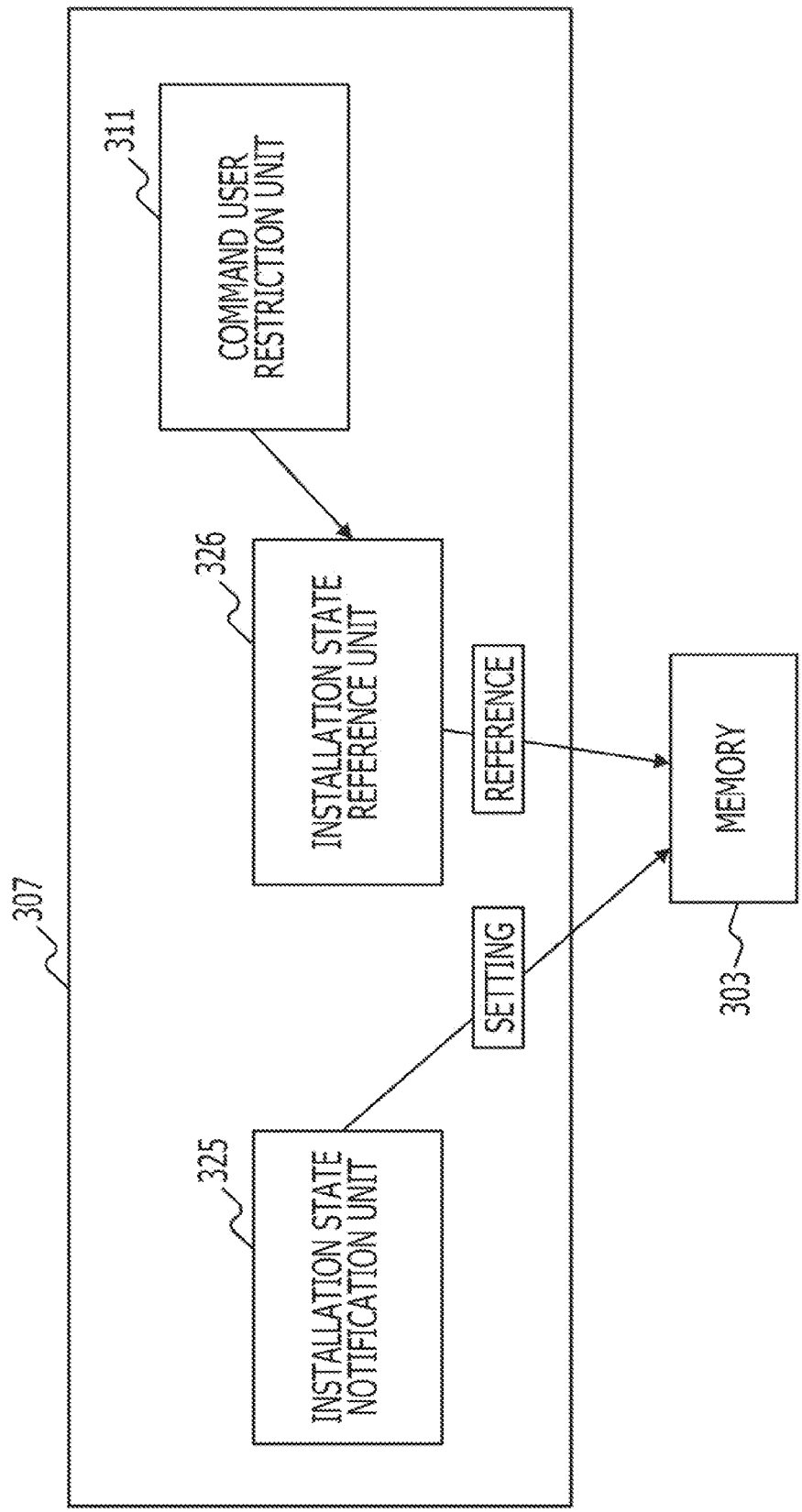
FIG. 15 illustrates a configuration of an OS of the command user restriction apparatus according to the embodiment.

FIG. 15 illustrates a configuration of the OS 307 of the command user restriction apparatus 301 according to the embodiment.

The OS 307 includes the command user restriction unit 311, an installation state notification unit 325, and an installation state reference unit 326.

The installation state notification unit 325 sets in the memory 303 the installation state information 206 indicating whether the command user restriction apparatus 301 is in a state of installing a program, such as an application program.

The command user restriction unit 311 refers to the installation state information 206 through the installation state reference unit 326, and determines whether the command user restriction apparatus 301 is in the installation operation.

The command user restriction unit 311 automatically ascertains the state of the command user restriction apparatus 301, and enables or disables the command user restriction function, to reduce or prevent an installation operation failure due to missing the change of the command user restriction unit 311 into the maintenance mode.

Figure 16:
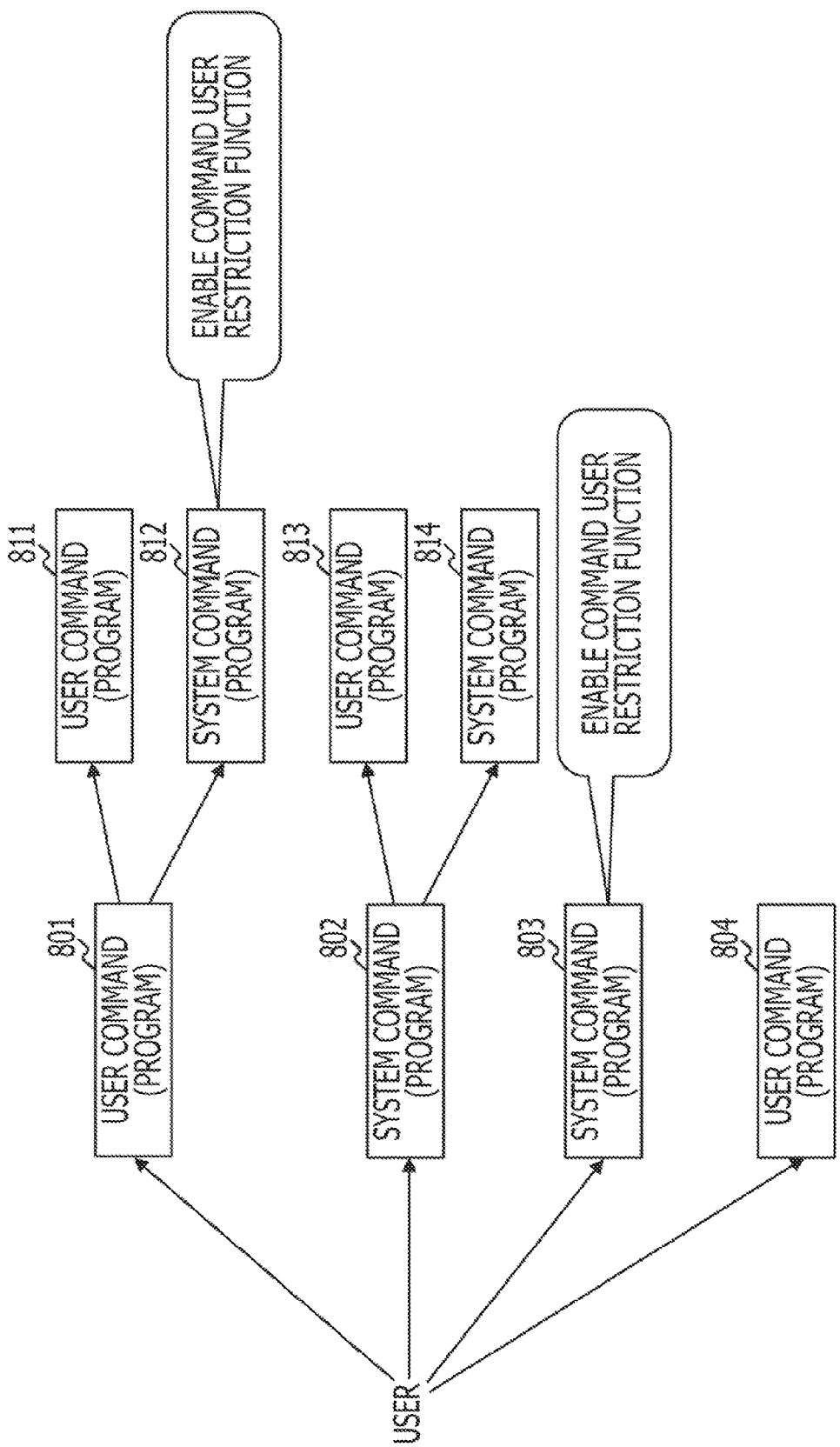
FIG. 16 illustrates conditions for running commands.

The program checking processing in operations S707 and S708 are described below. FIG. 16 illustrates conditions for running commands. An invoking program is executed by a user in this case. The conditions for running a command are as follows:

(1) A condition where an invoking program is a user command (program) 801 and the user command 801 invokes a user command (program) 811 as an invoked program.

(2) A condition where an invoking program is the user command (program) 801 and the user command 801 invokes a system command (program) 812 as an invoked program.

(3) A condition where an invoking program is a system command (program) 802 and the system command 802 invokes a user command (program) 813 as an invoked program.

(4) A condition where an invoking program is the system command (program) 802 and the system command 802 invokes a system command (program) 814 as an invoked program.

(5) A condition where a system command 803 does not invoke any other command.

(6) A condition where a user command 804 does not invoke any other command.

In the embodiment, the system command 803 that does not invoke another command and the system command 812 invoked by the user command 801 are regarded as targets of the command execution determination, that is, the command user restriction function is enabled for the system command 803 and the system command 812.

Figure 17:
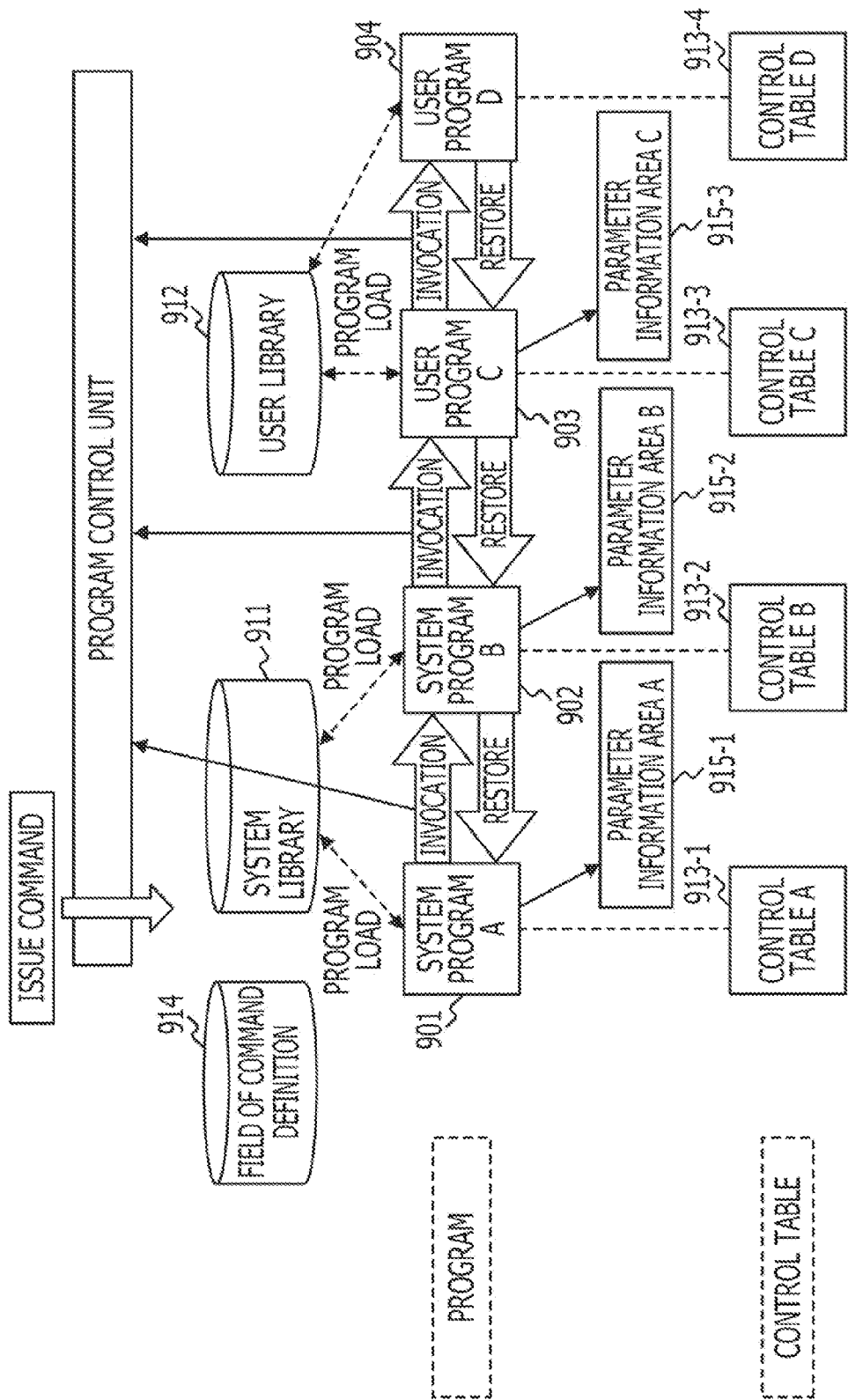
FIG. 17 illustrates checking processing to a user program and a system program.

FIG. 17 illustrates checking processing to a user program and a system program.

A case is described below where a system program A (901) invokes a system program B (902), the system program B (902) invokes a user program C (903), and the user program C (903) invokes a user program D (904).

When a program is invoked by another program, the invoking program is entered into the program control unit 314. The program control unit 314 determines whether the entered program is a target of the command execution determination as an entered command, and whether the command of the entered program is executable as an entered command.

For example, when the system program A (901) invokes the system program B (902), the system program B (902) is entered into the program control unit 314 as an entered command. After that, the program control unit 314 determines whether the system program B (902) is a target of the command execution determination and whether the command of the system program B (902) is executable.

A system program is stored in a system library 911. The system program is read from the system library 911 and executed as appropriate.

A user program is stored in a user library 912. The user program is read from the user library 912 and executed as appropriate.

Control tables 913-$n$ ($n$=1 to 4) include corresponding running program information. Each of the control tables 913-$n$ present correspond to each of the running programs. The control tables A (913-1), B (913-2), C (913-3), and D (913-4) are control tables corresponding to the system program A (901), the system program B (902), the user program C (903), and the user program D (904), respectively.

Each of the control tables 913-$n$ includes information such as the name of a library storing a program, the name of the program, and the type of program invoked by the program (e.g., a system command or a command other than the system command).

A field of command definition 914 includes information such as the name of a command, the name of a program invoked (e.g., loaded) by the command, and the type of the command (e.g., a user command or a system command).

Each parameter information area 915-$p$ ($p$=1 to 3) that is present corresponds to each program that invokes another program, respectively. The parameter information areas 915-1, 915-2, and 915-3 correspond to the system programs A (901), B (902), and the user program C (903), respectively.

Each of the parameter information areas 915 includes information such as the name of an invoked program and the type of the invoked program (e.g., a system command or a user command other than the system command).

The identification processing of the type of a command (program) in the program control unit 314 are described below. The program control unit 314 determines whether an invoking program is a user program or a system program with reference to the "name of a library storing a program" in each of the control tables 913-*n* corresponding to the invoking program.

The following are identification examples of the type of command in the program control unit 314 according to the embodiment.

When the first letter of a library name is "X", the program control unit 314 identifies an invoking program as a system program.

When the first letter of a library name is a letter other than "X", the program control unit 314 identifies an invoking program as a user program.

When the first letter of a library name is the special character "@", the program control unit 314 identifies an invoking program with the second letter or thereafter of the library name. For example, when a library name is "@TEMP", the program control unit 314 identifies an invoking program as a user program, and when a library name is "@PGMxxx", the program control unit 314 identifies an invoking program as a system program.

When the name of a library list where two or more libraries are compiled is specified in "the name of a library storing a program" in each of the control tables 913-*n*, or when a library name is omitted in each of the control tables 913-*n*, the program control unit 314 identifies an invoking program using a program name in each of the control tables 913-*n* because it is difficult to determine whether the invoking program is a user program or a system program.

When the first letter of a program name is "X", the program control unit 314 identifies an invoking program as a system program. When the first letter of the name of a program is a letter other than "X", the program control unit 314 determines whether an invoking program is a user program or a system program with reference to the type of command from the field of command definition 914 because it is difficult to determine whether the invoking program is a user program or a system program.

When an invoking program is a user program, the program control unit 314 identifies the type of invoked program using the type of invoked program or an invoked program name in the parameter information area 915.

When an invoked program is a system program, the invoked program is regarded as a target of the command user restriction function, and when an invoked program is a user program, the invoked program is not regarded as a target of the command user restriction function.

Whether the command user restriction function is enabled or disabled depends on the following conditions.

When a system program is invoked by a user program, the command user restriction function is enabled.

In a case other than when a system program is invoked by a user program, the command user restriction function is disabled.

In addition, in another embodiment, a system program invoked by a system program may be regarded as a target of the command execution determination.

In the command user restriction apparatus 301 according to the embodiment, whether an entered command is a target of the command execution determination is determined based on whether the entered command is invoked by a user command or a system command, so that a target of the command execution determination may be set in detail.

In addition, whether an entered command is a target of the command execution determination is determined based on whether the entered command is a user command or a system command, so that a target of the command execution determination may be set in detail.

All examples and conditional language recited herein are intended for pedagogical purposes to aid the reader in understanding the aspects of the invention and the concepts contributed by the inventor to furthering the art, and are to be construed as being without limitation to such specifically recited examples and conditions, nor does the organization of such examples in the specification relate to a showing of the superiority and inferiority of the aspects of the invention. Although the embodiment in accordance with aspects of the present invention has been described in detail, it should be understood that various changes, substitutions, and alterations could be made hereto without departing from the spirit and scope of the invention.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. An information processing apparatus comprising:
   a memory that stores command execution right information including execution right information indicating whether a command is executable; and
   a command determination unit that determines whether the command is a user command or a system command, determines whether an entered command is a target of a command execution determination where it is determined whether a command is executable based on whether the entered command is invoked by the user command or the system command, and determines whether the entered command is executable with reference to the command execution right information stored in the memory when the entered command is determined as the target of the command execution determination.

2. The information processing apparatus according to claim 1, wherein
   when the entered command is the system command and when the entered command is invoked by the user command, the command determination unit regards the entered command as the target of the command execution determination.

3. The information processing apparatus according to claim 2, wherein
   the command determination unit refers to system state information indicating whether the information processing apparatus is in a maintenance operation, and determines whether the command execution determination for the entered command is executed based on the system state information.

4. The information processing apparatus according to claim 2, wherein
   the command determination unit refers to installation state information indicating whether the information processing apparatus is in a state of installing a program, and determines whether the command execution determination for the entered command is executed based on the installation state information.

5. A non-transitory computer-readable recording medium storing a command execution determination program for directing a computer to perform a process of command execution determination, the process comprising:

determining whether an entered command is a user command or a system command;

determining whether the entered command is a target of a command execution determination where it is determined whether a command is executable, based on whether the entered command is summoned by the user command or the system command; and determining whether the entered command is executable with reference to command execution right information stored in a memory of the computer indicating whether a command is executable when the entered command is determined to be the target of the command execution determination.

6. The non-transitory computer-readable recording medium according to claim 5, the process further comprising:

regarding the entered command as the target of the command execution determination when the entered command is a system command and when the entered command is invoked by a user command.

7. The non-transitory computer-readable recording medium according to claim 6, the process further comprising:

referring to system state information indicating whether the computer is in a maintenance operation; and determining whether the command execution determination for the entered command is executed based on the system state information.

8. The non-transitory computer-readable recording medium according to claim 6, the process further comprising:

referring to installation state information indicating whether the computer is in a state of installing a program; and determining whether the command execution determination for the entered command is executed based on the installation state information.

9. A command execution determination method for a computer, the method comprising:

determining, using the computer, whether an entered command is a user command or a system command, determining, using the computer, whether the entered command is a target of a command execution determination where it is determined if a command is executable based on whether the entered command is invoked by the user command or the system command; and determining, using the computer, whether the entered command is executable with reference to command execution right information stored in a memory of the computer indicating whether a command is executable when the entered command is determined as the target of the command execution determination.

\* \* \* \* \*